United States Patent [19]

Golden et al.

[11] Patent Number: 5,484,135
[45] Date of Patent: Jan. 16, 1996

[54] FISH TAPE PULLER

[75] Inventors: Scott Golden, DeKalb; Bruce Mathwich, Cherry Valley, both of Ill.

[73] Assignee: Ideal Industries, Inc., Sycamore, Ill.

[21] Appl. No.: 308,400

[22] Filed: Sep. 19, 1994

Related U.S. Application Data

[63] Continuation of Ser. No. 118,182, Sep. 9, 1993, abandoned.

[51] Int. Cl.6 .................................................. E21C 29/16
[52] U.S. Cl. .................... 254/134.3 FT; 254/104
[58] Field of Search .......................... 254/104, 250–254, 254/134.3 FT, 134.3 R; 269/234, 217; 81/487; 15/104.31, 104.33, 143 R

[56] References Cited

U.S. PATENT DOCUMENTS

| 1,880,431 | 10/1932 | Goodall | 254/134.3 FT |
| 2,736,532 | 2/1956 | Hughes | 254/134.3 FT |
| 2,784,624 | 3/1957 | Plachecki | 269/217 |
| 3,734,481 | 5/1973 | Surwill | 269/234 |

FOREIGN PATENT DOCUMENTS

| 366119 | 3/1973 | U.S.S.R. | 269/234 |

Primary Examiner—Robert C. Watson
Attorney, Agent, or Firm—Dorn, McEachran, Jambor & Keating

[57] ABSTRACT

A fish tape puller has a handle connected to a body member having a first bearing surface. The handle extends on either side of the body so the handle can accommodate a two-handed grip. A clamp block slidably mounted on the body presents a second bearing surface opposite the first bearing surface to define a slot for receiving a fish tape. An interlocking key and groove in the clamp block and body extends obliquely to the slot. An actuating handle pivotally mounted on the body and connected to the clamp block causes the block to move in the groove, opening and closing the slot with a self-locking wedging action. The bearing surfaces are elongated to prevent damage to the fish tape.

15 Claims, 1 Drawing Sheet

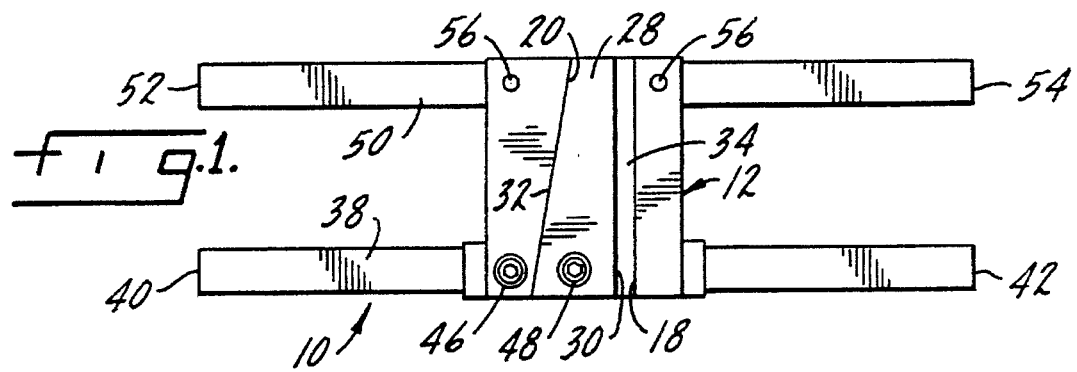
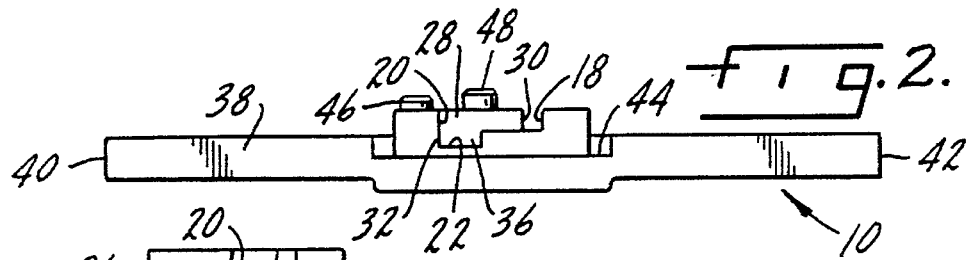
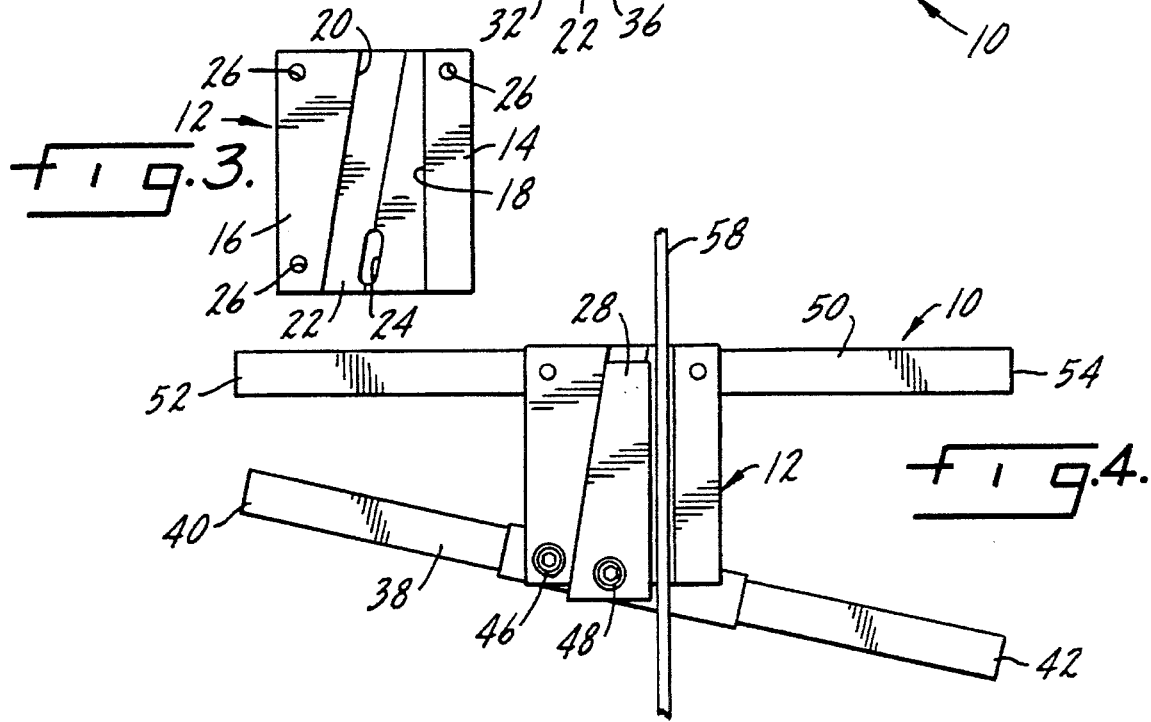
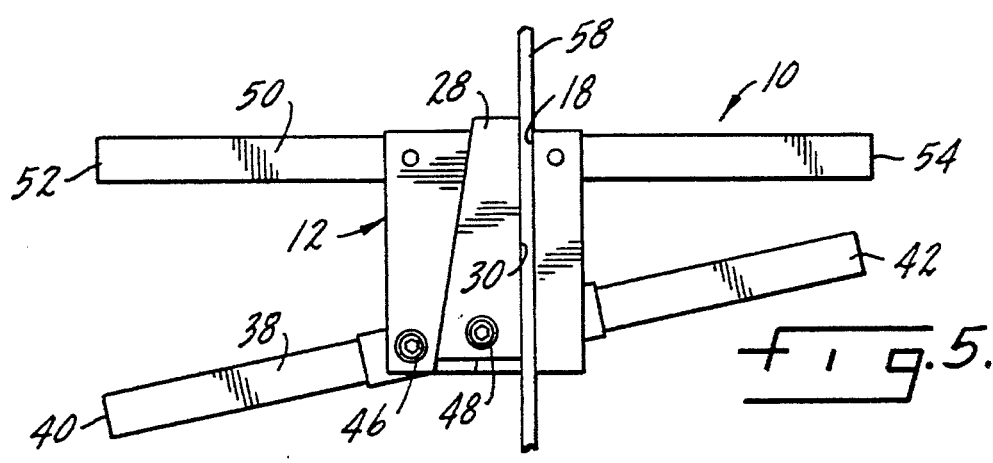
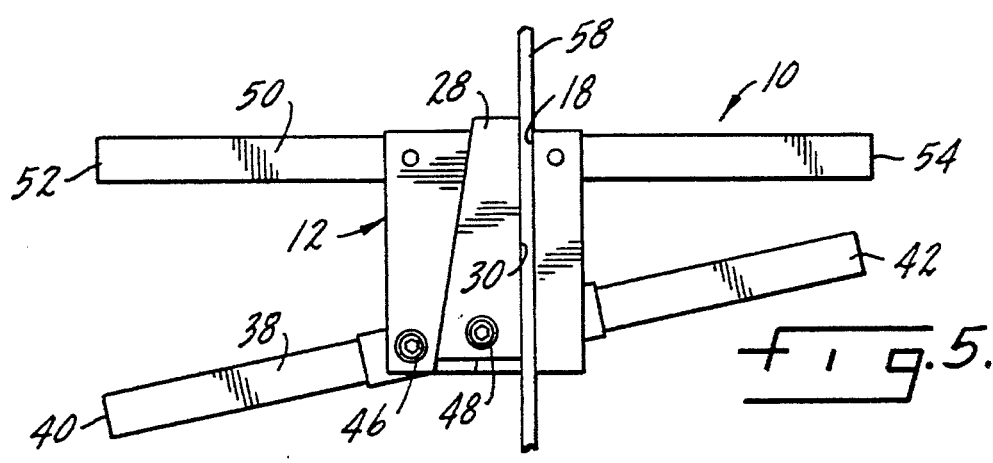

FISH TAPE PULLER

This is a continuation of application(s) Ser. No. 08/118,182 filed on Sep. 9, 1993 now abandoned.

BACKGROUND OF THE INVENTION

This invention relates to a an electrician's tool for pulling a fish tape through conduit. In the course of installing electrical wires in conduit, it is customary for an electrician first to pass an elongated, stiffly-flexible line called a fish tape through the conduit. The lead end of the wire is then fastened to the end of the fish tape and the tape is retracted to pull the wire forwardly through the conduit.

Fish tapes are made of various materials. Steel ribbon tapes, wire-wound tapes and nylon-sheathed fiberglass tapes are known types. Whatever material is used, a common problem is finding a way to grip and pull the fish tape firmly and without damage to either the electrician's hands or the fish tape. Examples of prior art pulling tools are shown in the following U.S. Pat. Nos. Ehrens 3,763,722, Lopes 4,746,099 and Lopes 5,022,633. These tools suffer from the disadvantage of concentrating the clamping force in a small area of the fish tape, risking damage to the tape in the contact zone. Other tools exhibit difficulties in manipulating the clamping action. Still others cannot be gripped with two hands so the pulling force is limited. The present invention is intended to address these problems.

SUMMARY OF THE INVENTION

This invention concerns a tool for gripping, pulling and releasing a fish tape. One of the objects of the invention is a fish tape pulling tool which provides a means to grip and release a fish tape without damage to the fish tape.

Another object of the invention is a tool of the type described which allows the electrician to easily and quickly release and regrip the fish tape.

A further object is a pulling tool which allows a two-handed grip to be used. This provides for a greater amount of force to be used in retracting the fish tape.

Still another object of the invention is a pulling tool which allows the fish tape to be gripped, retracted, and released without repositioning of the hands during operation.

Yet another object is a pulling tool which allows both arms to pull evenly when operating the tool.

Another object is a pulling tool having a locking wedge which is self-tightening, i.e., the harder the pull on the tool, the tighter the tool grips the fish tape.

These and other object which may become apparent in the following description are realized by a fish tape puller having a body member fixedly attached intermediate the ends of a stationary handle. The body member has a fixed block defining a first bearing surface. An actuating handle with first and second ends, is pivotally attached intermediate its ends to the body member. A clamp block is mounted on the body member and includes a second bearing surface opposite the first bearing surface to define a fish tape receiving slot between the two surfaces. The clamp block is connected to the actuating handle such that squeezing the first ends of the handles together will open the slot while squeezing the second ends of the handles together will close the slot.

BRIEF DESCRIPTION OF THE DRAWING

FIG. 1 is a top plan view of the fish tape pulling tool according to the present invention.

FIG. 2 is a front elevation view of the tool.

FIG. 3 is a top plan view of the tool's body member.

FIG. 4 is a plan view of the tool with a fish tape positioned in an opened fish tape receiving slot.

FIG. 5 is a plan view of the tool with a fish tape gripped tightly for pulling.

DETAILED DESCRIPTION OF THE INVENTION

FIGS. 1–2 illustrate the complete fish tape puller 10 while FIG. 3 shows the body member 12 with other parts removed for clarity. The invention will described with reference to these three Figures. Looking first at the body member 12, it generally comprises a plate having first and second fixed blocks 14 and 16 on its upper surface. The inside edge of the first fixed block 14 defines an elongated, flat, first bearing surface 18. The inside edge of the second fixed block 16 is cut obliquely to the outer edges of the body member and defines an angled surface 20.

Between the fixed blocks 14 and 16 is a groove 22 which is cut so that it is parallel to the angled surface 20 and oblique to the bearing surface 18. A slot 24 at one edge of the groove 22 extends all the way through the plate of the body member 12. Holes 26 through the body member are formed at three corners thereof.

Looking at FIGS. 1 and 2, a generally wedge-shaped clamp block 28 is disposed between the fixed blocks 14 and 16 of the body member. The clamp block defines an elongated, flat, second bearing surface 30 on one side and an oblique guide surface 32 on the other. Bearing surface 30 cooperates with the first bearing surface 18 and the body member plate to define a fish tape receiving slot 34. The guide surface 32 engages the angled surface 20 to guide sliding movement of the clamp block 28 on the body member 12. The underside of the clamp block has a key 36 (FIG. 2). The key is shaped to fit down into the groove 22, constraining the clamp block for sliding movement along the groove.

Two handles are attached to the body member. An actuating handle 38 has first and second ends 40 and 42. The handle has a depressed central portion 44 as seen in FIG. 2, which receives the body member. The actuating handle is pivotally connected to the body member by a pin 46 which extends through one of the holes 26 in the body member. A second pin 48 extends through the clamp block 28 and the slot 24. Thus, when the actuating handle pivots about pin 46, the clamp block is activated by the pin 48 to slide in groove 22.

A second, stationary handle 50 having first and second ends 52 and 54 is fixed to the body member 12 by bolts 56 or the like. The bolts extend through holes 26 in the body member and similar openings in the stationary handle.

The use, operation and function of the fish tape puller 10 are illustrated in FIGS. 4 and 5. A portion of a fish tape is shown at 58. The user grasps the tool by wrapping his or her fingers around the stationary handle 50, one hand on one side of the body member and the other hand on the opposite side of the body. The user's thumbs curl around the ends of the actuating handle 38 to manipulate the handle to either the slot opening position of FIG. 4 or the slot closing position of FIG. 5.

In FIG. 4 it can be seen that when the first ends 40 and 52 of the handles are squeezed toward one another the resulting pivoting motion of the actuating handle 38 causes downward movement of the pin 48, pulling the clamp block 28 downwardly and away from the fixed block 14. This opens the fish tape receiving slot 34, either for initial entry of the fish tape therein, or for sliding the tool along the fish tape to clamp on a new location.

In FIG. 5 the second ends 42 and 54 of the handles are squeezed toward one another. This moves the clamp block 28 forwardly, decreasing the space between the bearing surfaces 18 and 30 and thereby locking the tool on the fish tape for pulling. The pulling action is toward the bottom of the FIGURE. Thus, the harder the pull, the greater the tendency for the clamp block to be wedged up against the fish tape. This self-locking feature permits generation of great pulling force without relying solely on the user's ability to squeeze the handles together. It will also be noted that the relatively long bearing surfaces 18 and 30 distribute the clamping force over an expanse of the fish tape that will prevent localized damage to the tape.

Whereas a preferred embodiment of the fish tape puller has been shown and described, it will be realized that alterations may be made thereto without departing from the scope of the following claims.

We claim:

1. A fish tape puller, comprising:
    a body member having an elongated, flat first bearing surface;
    a clamp block slidably attached to the body member and slidable toward and away from the first bearing surface, the clamp block including an elongated, flat second bearing surface opposite and parallel to the first bearing surface such that the first and second bearing surfaces define an elongated, straight slot between them for receiving a fish tape; and
    a handle connected to the clamp block for moving the clamp block toward and away from the first bearing surface.

2. The fish tape puller of claim 1 wherein the body member includes a groove disposed at an angle to the first bearing surface and the clamp block has a key slidably engaging the groove to cause the clamp block to move obliquely to the first bearing surface.

3. The fish tape puller of claim 2 wherein the body member further comprises a fixed block adjacent the groove and having an angled surface parallel to the groove.

4. The fish tape puller of claim 3 wherein the clamp block has a guide surface engaged with the angled surface of the fixed block.

5. The fish tape puller of claim 1 further comprising a second handle attached to the body member.

6. The fish tape puller of claim 5 wherein the handles extend beyond the body member on two sides thereof.

7. The fish tape puller of claim 1 wherein the handle is pivotally connected to both the body member and to the clamp block.

8. A fish tape puller, comprising:
    a body member having a plate and first and second fixed blocks, the first fixed block including a first bearing surface and the second fixed block including an angled surface oblique to the first bearing surface;
    a clamp block mounted on the body member and including a second bearing surface opposite and parallel to the first bearing surface to define an elongated, straight slot between said surfaces for receiving a fish tape, and a guide surface in contact with the angled surface of the second fixed block; and
    a handle connected to the clamp block for moving the clamp block obliquely to the first bearing surface, along the interface of the angled surface and guide surface, thereby moving the second bearing surface to open and close said fish tape receiving slot.

9. The fish tape puller of claim 8 wherein the plate includes a groove disposed parallel to the angled surface and the clamp block has a key slidably engaging the groove.

10. The fish tape puller of claim 9 further comprising a second handle attached to the body member.

11. The fish tape puller of claim 10 wherein the handles extend beyond the body member on two sides thereof.

12. The fish tape puller of claim 8 wherein the handle is pivotally connected to both the body member and to the clamp block.

13. A fish tape puller having a stationary handle with first and second ends, a body member fixedly attached to the stationary handle intermediate its first and second ends, the body member having a first bearing surface, an actuating handle with first and second ends, the actuating handle being pivotally attached intermediate its ends to the body member, a clamp block mounted on the body member and including a second bearing surface opposite the first bearing surface to define a slot between said surfaces for receiving a fish tape, the clamp block being connected to the actuating handle such that squeezing the first ends of the handles together will open said slot and squeezing the second ends of the handles together will close said slot.

14. The fish tape puller of claim 13 wherein one of the body member and clamp block has a groove disposed obliquely to the first bearing surface and the other has a key in interlocking relation with the groove.

15. The fish tape puller of claim 14 wherein the actuating handle is pivotally connected to the clamp block.

* * * * *